United States Patent

Krogmann

[11] Patent Number: 6,099,228
[45] Date of Patent: Aug. 8, 2000

[54] BALE LIFTING APPARATUS

[76] Inventor: Frank R. Krogmann, Rte. 4, Box 150, Sabetha, Kans. 66534

[21] Appl. No.: 09/440,357

[22] Filed: Nov. 15, 1999

Related U.S. Application Data

[60] Provisional application No. 60/108,693, Nov. 17, 1998.
[51] Int. Cl.$^7$ .................................................. A01D 90/00
[52] U.S. Cl. ........................................ 414/24.6; 296/183
[58] Field of Search .................................. 293/116, 117, 293/182, 183; 414/24.5, 24.6, 546, 555, 911

[56] References Cited

U.S. PATENT DOCUMENTS

| | | | |
|---|---|---|---|
| 3,880,305 | 4/1975 | Van Polen | 414/24.6 |
| 3,908,846 | 9/1975 | Brummitt | 414/24.6 |
| 3,934,726 | 1/1976 | Martin | 414/24.6 |
| 4,090,624 | 5/1978 | Krein et al. | 414/24.6 |
| 4,412,768 | 11/1983 | Bauer et al. | 414/24.6 |
| 4,564,325 | 1/1986 | Ackerman | 414/24.5 |
| 4,579,497 | 4/1986 | Nine | 414/24.5 |
| 4,594,041 | 6/1986 | Hostetler | 414/24.5 |
| 4,687,402 | 8/1987 | Zatylny | 414/24.6 |
| 4,722,651 | 2/1988 | Antal | 414/24.5 |
| 5,584,637 | 12/1996 | Jensen, Sr. | 414/24.6 |

FOREIGN PATENT DOCUMENTS 2337496  8/1977  France ................................. 414/24.6

Primary Examiner—Janice L. Krizek
Attorney, Agent, or Firm—Bruce J. Clark

[57] ABSTRACT

A bale lifting device for use with flatbed trucks has a rigid bed member, recessed portions at each corner for receiving a portion of a pair of hinged arms, a rigid housing hingedly attached to the truck bed, two rigid arms, each having two members attached at an angle, with respect to the other, one portion of which is received in the recessed portion of the bed, and where the housing is hydraulically hinged to the bed so as to provide for movement of the arms to and from a first lowered position having the arms extending outwardly from the rear end of the bed, to a second stored position having the arms rest on top of the bed without regard to any hinged position of the arms, and so as to allow the arms to rest on the bed and act as siderails to the bed; a pair of spinners having holding shafts angularly attached is removably attached to the rigid arms to create a functional multiuse flatbed with hinged arms that are both flush and that act as siderails.

2 Claims, 6 Drawing Sheets

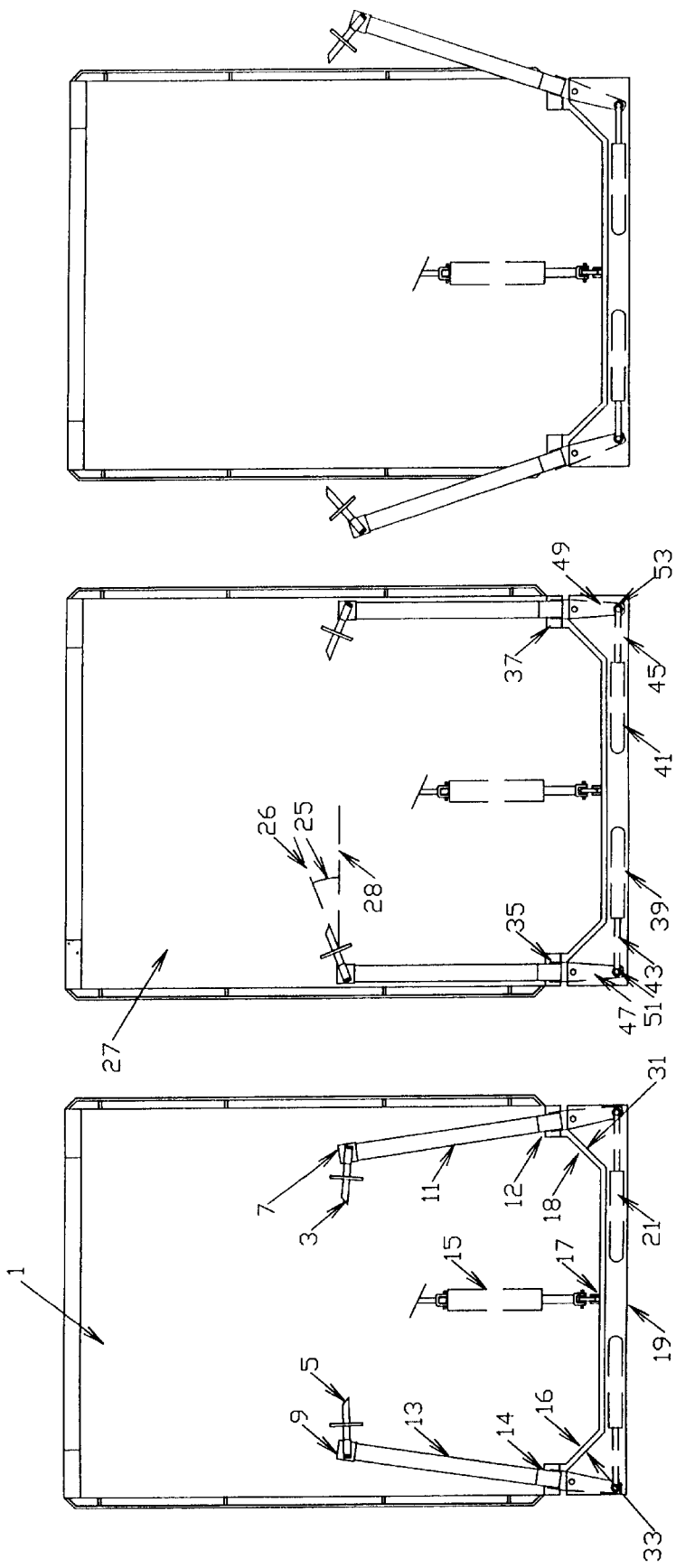

BALE LIFTING APPARATUS

This application claims the benefit of U.S. Provisional Application 60/108,693 filed Nov. 17, 1998.

BACKGROUND OF INVENTION

This invention relates to bale handling devices, particularly those loading and unloading devices used on or with flatbed trucks for carrying bales.

Typical bale handling devices are arranged such that damage can easily occur to the bales because of the location and angle of the spinners in relation to the lifting arms. Moreover, the angle of the spinners is such that pressure is placed on the bearing portions of the spinner in a way so as to cause unnecessary wear on the rotating parts as unnecessary pressure is exerted on rotating parts. Moreover, the spinners often have to be removed or special arrangements have to be made for the spinners in the middle of the bed of the truck, to accommodate them during non-use when the arms are resting on or near the bed.

Moreover, those bale handling devices often assembled with truck beds interfere with other uses of the bed, for example some devices interfere with the access to the end of the truck bed for loading and unloading of other loads. Many are actually sitting on or interfere with the top loading on the truck bed itself when not in use. Still others that rest below the truck bed leave the bed exposed with no sides that would otherwise allow the bed to be used to haul other loads.

Moreover, some bale lifting devices that utilize the truck bed have exposed working parts and mechanisms that usually prove hazardous and that easily allow for interference with the items and loading, which items sometimes get caught between the platform and parts of the lifting mechanism.

Consequently it is the object of this invention to provide a truck bed and bale lifting assembly to minimize damage to the bales by the spinners, that minimizes wear and tear on the spinners, that neatly combine together to allow for versatile uses of the truck bed, that provide for clear rear access that even extends the length of the bed, that is useful for loading and carrying items other than bales, that has arms that function also as sides to the bed when resting on the bed, that is not susceptible to damage by the arms and spinners when resting on the bed but allows the spinners to achieve a lower position for unloading and unrolling the bales, and to achieve all of this utilizing a mechanism that comes together and unfolds neatly, efficiently, and in a safe manner that does not easily allow for hay and other articles to fall into the pivot points and other moving mechanisms.

This invention is a flatbed bale lifting assembly wherein the lifting apparatus is a neatly tucked assay unit, even extending the end of the bed, to provide a simple flatbed with unobstructed access to the end of the bed when the arms are in the rest position (moving parts and hydraulic assembly remain unseen), with the exception that the arms themselves act as siderails during the rest position. With no special slots for the spinners, the spinners need not be removed to load other items. The spinners are situated at a greater than 90° angle with respect to the arms, thus avoiding damage to the bales by the spinners while allowing far less wear on the spinner rotational parts.

Other objects and features of the invention and the manner in which the invention achieves its purpose will be appreciated from the foregoing and the following description and the accompanying drawings which exemplify the invention, it being understood that changes may be made in the specific method and apparatus disclosed herein without departing from the essentials of the invention set forth in the appended claims.

DESCRIPTION OF THE DRAWINGS

FIG. 1 is a top view of the bed with the arms rotated inward as if they were holding a bale.

FIG. 2 is the top view of the bed and lifting assembly with the arms in a resting position flat against the bed during storage and when no bale is being loaded or shipped.

FIG. 3 is a top view of the bed and lifting assembly with the arms in an open position.

DESCRIPTION OF THE PREFERRED EMBODIMENT

Figure 4:
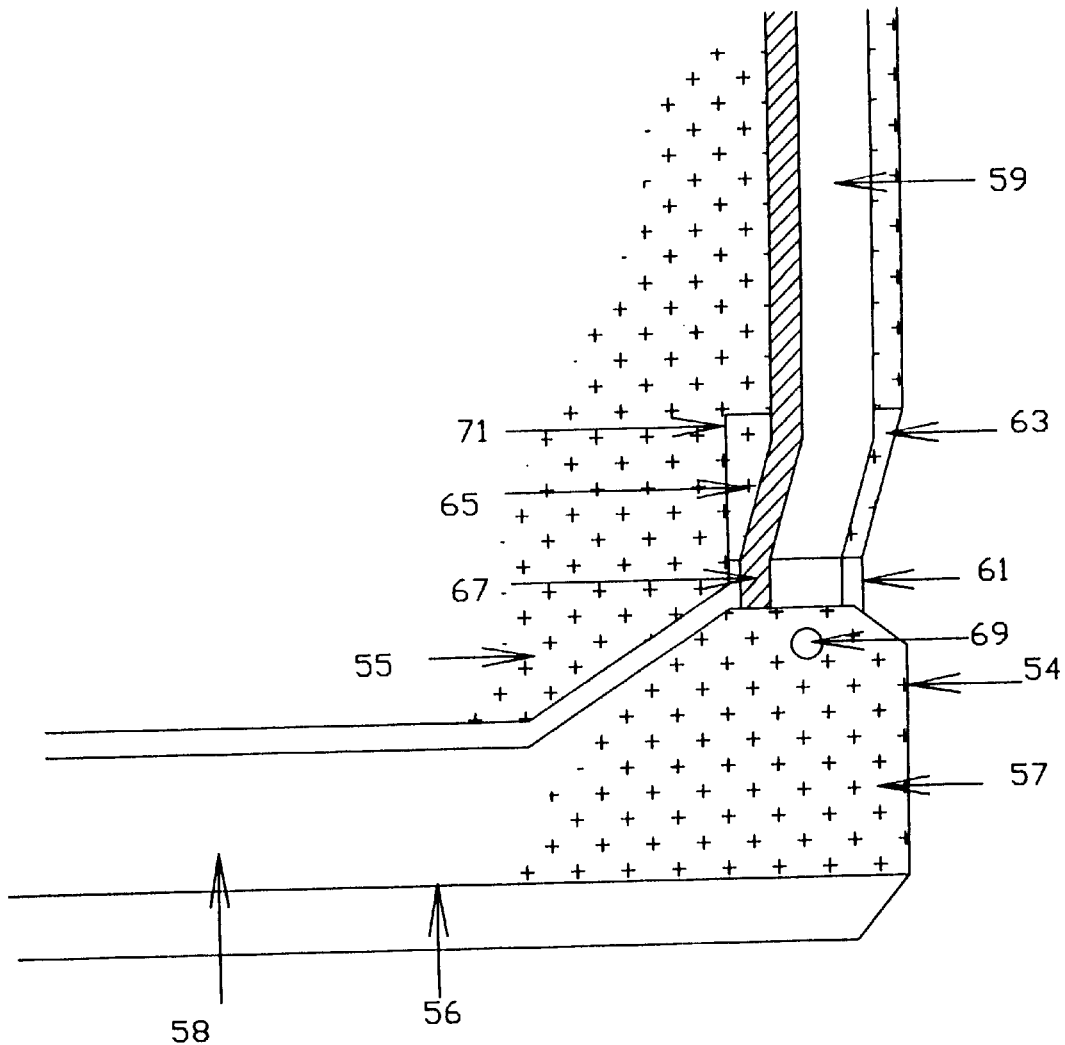
FIG. 4 is a perspective view of the rear end of the bed and lifting assembly at one corner (looking down from above).

The invention is shown as a bed with arm lifting apparatus from the top view in FIG. 1. The bed 1 is constructed as a large rigid flat planer member suitable for affixing to the chassis of a truck, and has clearance recesses 12 and 14 at one end for receiving the lower parts of the arms 11 and 13, described in more detail further herein. The bed has diagonal corners 16 and 18, that in the preferred mode, align and correspond to the angled corners 31 and 33 of the rear lifting assembly structure 19 to provide a contiguous flat bed surface at that location, even extending the flat bed when the lift assembly is resting. These diagonal corners allow the lifting assembly to be larger, thus stronger, and allow for the ends of the arms room for movement at the hydraulic connection.

The spinners 3 and 5 are engaging the bale while affixed to the upper portions of the arms 11 and 13 at an angle at 7 and 5 as shown in FIG. 1. This angle is significant and is more apparent in FIG. 2. By not placing these perpendicular to the arms 11 and 13, but instead at a preferred angle of approximately 10–30° (13° in the preferred mode), not only is damage to the bale minimized as the spinners grab the bale, but unnecessary wear to the spinner assembly is avoided. This is because pressure or stress is placed on the typical perpendicular spinner mechanisms as the arms come together and come into contact with the bale. Although the preferred angle is 22°, it should be understood that the angle can be a range of between 10° and 30° to accomplish this. The angle referred to herein is measured as that angle 25 between the spinning axis 26 of the spinner and the imaginary line 28 perpendicular to the elongated axis of the arms.

It will be seen that the hydraulic cylinders 39 and 41 push and pull their respective rods 43 and 45, so as to move the arm bases 47 and 49 respectively by pivoting at pins 51 and 53 rotationally connecting the cylinder rods to the arm bases. As discussed earlier, angled corners 31 and 33 allow for this movement within the assembly.

FIG. 4 shows the apparatus in the rest position. The bed of the truck 55 is flush with the top 57 of the rear housing while the arm 59 rests on the bed and in the recess 61. Thus the truck bed is essentially extended, moreover, it is easily accessible since the front 56 becomes essentially the end of the bed, with no obstructions. In the preferred mode, the top 57 is made of the same material 58 as the bed 55 so as to appear as, and be, a contiguous bed.

The arm 59, in the rest position, provides a side to allow the use of the truck bed for carrying other loads and have some form of rail or stop means preventing them from sliding off. The recess 61 has a back slanted side 63 corresponding essentially with the slanted portion 65 of the arm 59. The arm 59 has an upper portion as shown and a lower portion 67 rigidly connected to each other so the lower portion is inserted into the rear assembly casing 54 and is connected to the pivot pin (preferably nut and bolt assembly) 69. Consequently it will be seen that the arm is caused to pivot about pin 69 as the hydraulic cylinder inside the rear assembly housing 57 moves the arm tail (49 in FIG. 2). The recess 61 is sufficiently wide so as to allow the arm 59 to pivot without contacting the side 71 of the slot during normal travel of the arm when using the arms to lift the bales.

This entire assembly, and as shown in FIG. 4, allows the bed and the flush rear assembly to be utilized as a platform and to allow unobstructive loading from the rear when the arms are at rest, inasmuch as the rear assembly itself constitutes a further extension of the truck bed, and further allows such arrangement with side stops (minnie side rail arms 59). Consequently the entire arrangement allows the truck bed to be more versatile and have broader uses.

Figure 5:
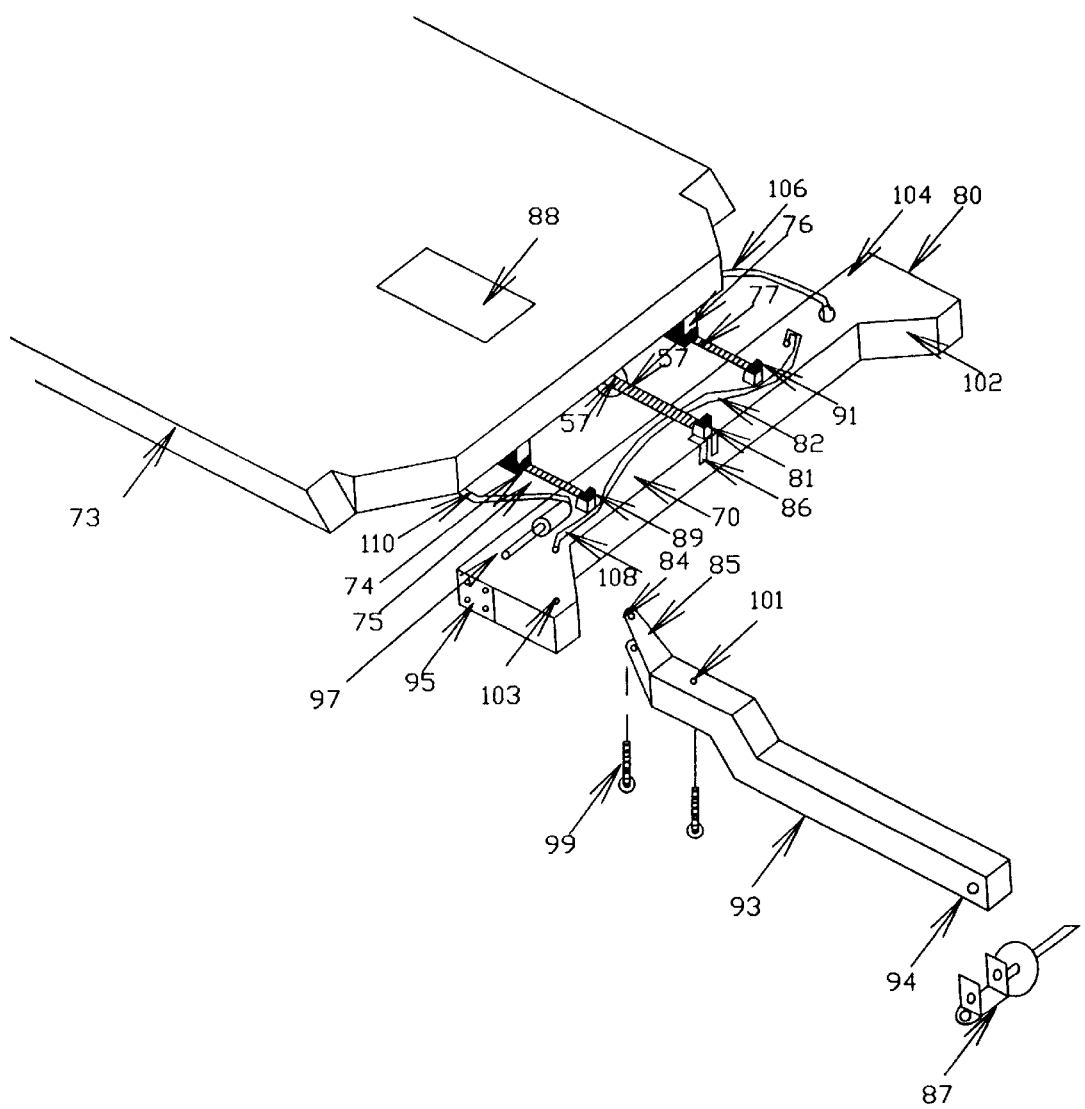
FIG. 5 is perspective view of the bed and lifting assembly, but showing the arm and spinner in an unloading mode.

FIG. 5 shows a perspective exploded view of the lifting assembly in an unloading position. Most working parts including the left arm moving cylinder 97 (and corresponding right arm moving cylinder, not shown in FIG. 5) are enclosed in the housing 102 between the bottom panel 104 and the top of the housing. The bottom 104 has pivot hinges 89 and 91 affixed thereto. Pivotally thereto are connected to elongated rigid horizontal support members 75 and 77 whose opposing ends are rigidly affixed to the underside of the bed 73. This is accomplished using rigid bracket extensions 74 and 76 affixed to the bed. The hydraulic lift cylinder 78 has horizontally moveable shaft 79 pivotally connected at 82 to the linkage plate assembly 81 affixed to the rear assembly. It will be seen that as the lift cylinder shaft 79 is moved inward during hydraulic movement of cylinder 78, the assembly 81 is pulled forward, rotating about pivot connection 82 so as to raise the entire assembly including base 72 and arms to a nearly 180° rotation so as to bring the top of the base 72 essentially flush with the bed of the truck. This is the typical movement during loading and unloading and it will be seen that the base and arm assembly pivots on hinge pivot points 89 and 91 during movement. Access door 88 allows easy access to the cylinder 78.

The arm 93 is shown in an exploded view as is the spinner assembly 87. Plate 95 is removable so as to gain access to the pivot hydraulic cylinder 97, having one end of its shaft pivotally connected at 84 to the arm base 85 utilizing pins (preferably nut and bolt assembly) 99. A second pin assembly 101 is utilized to pivotally connect the arm base to the rear assembly housing at 103. The spinner assembly 87 is then bolted to the end of arm 93 at 94.

Figure 6:
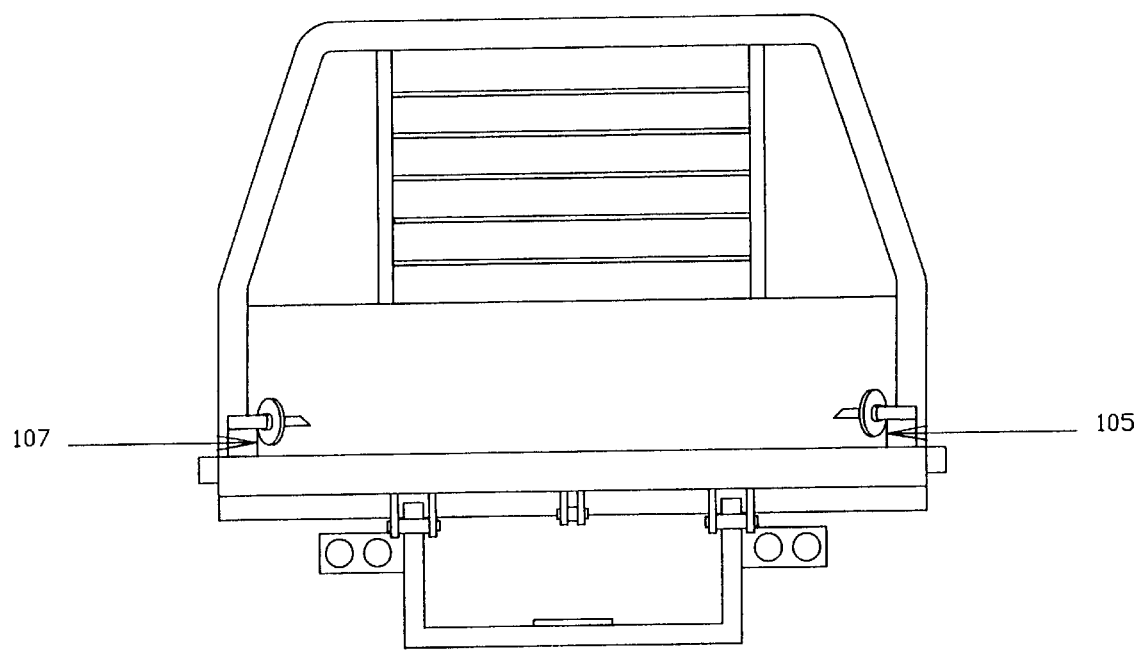
FIG. 6 is a rear view of the bed and lifting assembly, but also showing the headache rack.

FIG. 6 shows a rear view of the apparatus with a typical truck cab, and shows the arms 105 and 107 acting as small railings on the bed of the truck.

Figure 7:
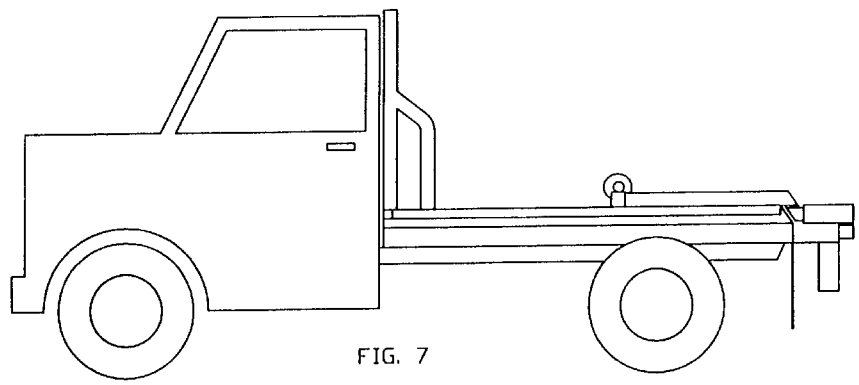
FIG. 7 is a side view of the bed and lifting assembly on a truck chassis with the arms in a resting position.
Figure 8:
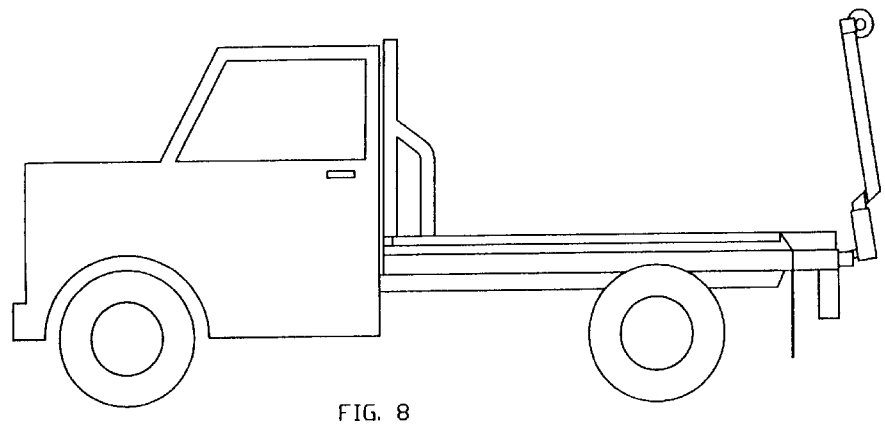
FIG. 8 is a side view of the bed and lifting assembly on a truck bed chassis with the arms in an upright position.
Figure 9:
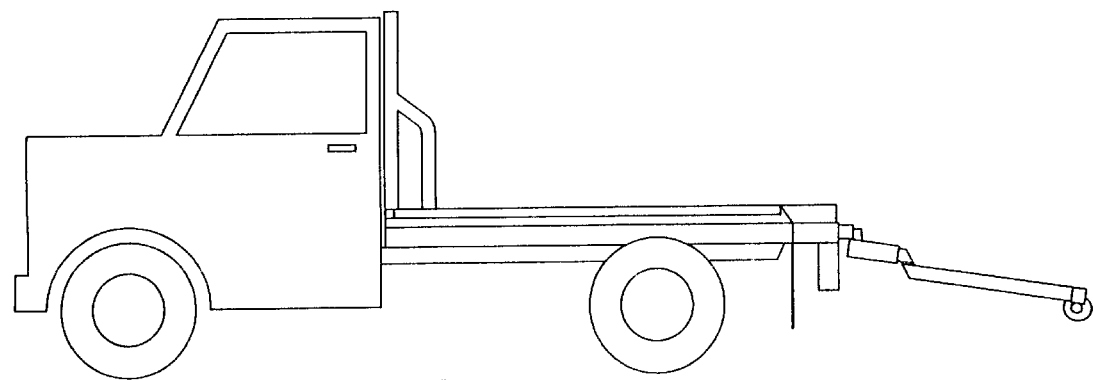
FIG. 9 is a side view of the bed and lifting assembly on a truck bed chassis with the arms in the lower (loading) position.

FIGS. 7, 8 and 9 show the side view of the bed and rear assembly apparatus shows the apparatus in the resting position (FIG. 7), the loading position (FIG. 8) and the unloading position (FIG. 9).

Figure 10:
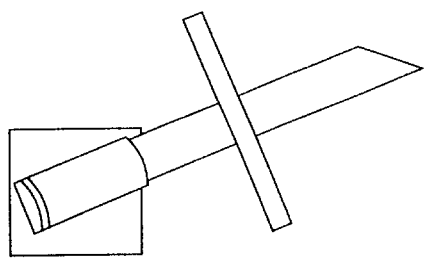
FIG. 10 is a top view of the spinner assembly (left spinner).
Figure 11:
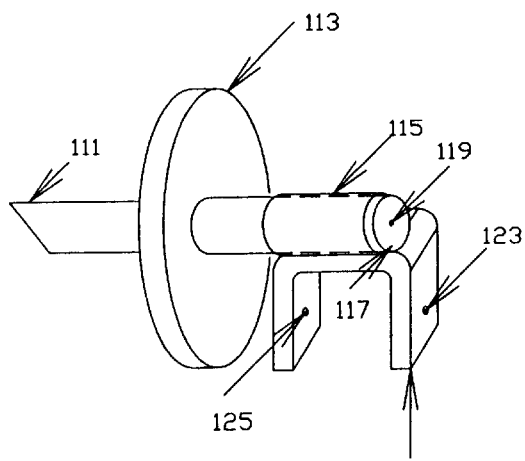
FIG. 11 is a perspective view of the entire spinner assembly.

FIG. 10 shows the spinner at its preferred angle of 130. In FIG. 4 the spinner shaft 111 penetrates, and is attached to the backing plate disk 113. The shaft 111 rotates inside the sleeve 115. End cap 117 is affixed to the opposing end of the shaft 111 so as to prevent the entire spinner slipping out of the sleeve (bushing) 115. Grease is provided via grease zerk 119. The bushing 115 is affixed to the base 121. The base is affixed to the arm utilizing holes 123 and 125.

Figure 12:
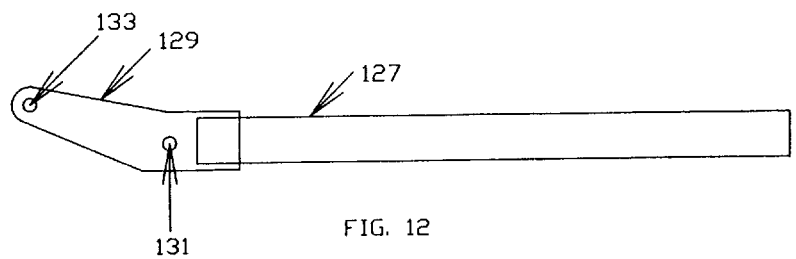
FIG. 12 is a top view of the arm assembly.

FIG. 12 shows a top view of the arm comprised of elongated rigid member 127 affixed to the arm base 129, which arm base has pivot holes 141 and 143 extending through it. Base 129 extends at an angle, away from the longitudinal axis of the arm, to near the hydraulic shaft connection hole 133, to allow the maximum efficient transfer from the hydraulic shaft cylinder to the arm 127.

Figure 13:
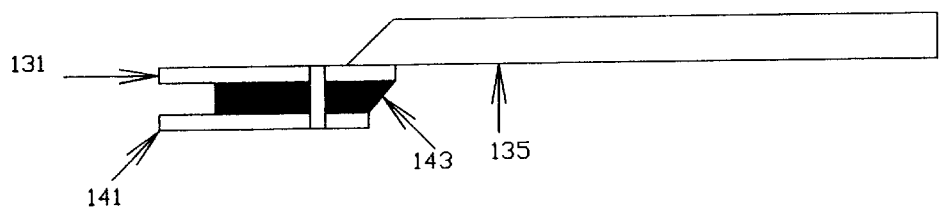
FIG. 13 is a side view of the arm assembly.

FIG. 13 shows a side view of the arm comprised of the elongated member 135 affixed to the bottom rigid member 147 which itself is comprised of an upper plate 139 and a lower plate 141 rigidly affixed to the filler bar 143. In an alternative mode, these parts 139, 143 and 147 can be during construction to achieve the same result.

The hydraulics are (two arm driving and the assembly raising hydraulics) are operated via typical hydraulic controls and powered by the engine. Hydraulic hoses 106, 108 and 110 service the two arm moving hydraulics within the housing. In the preferred mode, the electric valves are used; moreover, the two arm driving hydraulics are controlled using master-slave hydraulic controls so as to allow the arms to work together when grabbing the bale, reducing damage. When one arm grabs hold, if the bale is slightly off center when aligning, the controls allow that arm to hold while the other continues. It will also be seen that the two arms act as pinch arms (ends of both arms move towards and away from each other pivoting about their opposing end) as opposed to hugger action, (entire arms move towards and away from each other). Hugger arms can be difficult to manage or cause damage when the bale is worked unbalanced, or larger on one end, for example.

In use, once the bed is affixed to the chassis of the truck, one simply puts the arms in the down (loading) position, opens them wider than the bale, backs up to the bale, operates the side hydraulic cylinders so as to bring the arms together in the center of the bale, and then reverses the lift cylinder so as to raise the bale onto the bed of the truck. The bed is of such a size, in a preferred mode, so as to allow the transport of more than one bale, in which case the process is simply repeated. When not used as a bale handler, the arms simply rest on the bed of the truck, at the sides, allowing for carrying of other loads with unobstructed access to an extended bed. It can be seen therefore that a unique and efficient bale handling platform and lift mechanism is provided that also allows for a versatile and unobstructed loading and carrying platform.

While there have been shown and described particular embodiments of the invention, it will be obvious to those skilled in the art that changes and modifications may be made without departing from the invention or its equivalent, and, therefore, it is intended to cover all such changes and modifications as fall within the true spirit and scope of the invention.

I claim:

1. A bale lifting device for use with flatbed trucks comprised of:
   a. a rigid planar bed member, having a front end and a rear end, and the rear end having two opposing corners, said planar bed member suitable for affixing to a chassis of a truck;
   b. recessed openings at each corner of the rear end of the planar bed member;
   c. a rigid lift assembly housing extending the distance from near one corner of the rear end of the bed member to the opposing corner of the rear end of the bed member, having a top side and a bottom side, and two ends, and hingedly connected to the bed member;
   d. a pair of lift arms, each lift arm comprised of a first elongated rigid member having a bottom and having a first end and a second end, and a second elongated rigid member substantially shorter than the first and having a first and second end, wherein the first end of the second member is attached to the first elongated member near the second end of the first member, and wherein the second end of the second rigid member is hingedly attached to the underside of the lift assembly housing;
   e. hinge means attached between the lift assembly housing and the bed member for allowing rotational movement of the lift assembly housing about the bed member so as to provide for movement of the arms to and from a first lowered position having the arms extending outwardly from the rear end of the bed member, to a second stored position having the arms rest on top of the bed member without regard to any hinged position of the arms, and so as to allow the arms to rest on the bed member and act as siderails to the bed member;
   f. means for hingedly moving the arms near each corner of the bed member;
   g. a pair of spinners removably attached to the first elongated member of each arm near the first end wherein each spinner is comprised of a rigid elongated shaft affixed perpendicularly to a rigid planar plate member, and rotationally attached to a spinner base member so as to act as holding means for the bales, and wherein the spinner is removably attached to the arm such that no portion of the spinner extends below the bottom of the first elongated member of each arm.

2. The bale lifting device in claim 1 wherein the spinners are affixed to the pair of arms such that the spinning axis of the spinner is at an angle between 10 degrees and 30 degrees from an imaginary axis concurrent with the rigid arm members.

* * * * *